(12) United States Patent
Khare et al.

(10) Patent No.: US 11,818,102 B2
(45) Date of Patent: Nov. 14, 2023

(54) SECURITY ENHANCEMENT ON INTER-NETWORK COMMUNICATION

(71) Applicant: Nokia Technologies Oy, Espoo (FI)

(72) Inventors: Saurabh Khare, Bangalore (IN); Chaitanya Aggarwal, Munich (DE); Anja Jerichow, Grafing bei München (DE)

(73) Assignee: NOKIA TECHNOLOGIES OY, Espoo (FI)

(*) Notice: Subject to any disclaimer, the term of this patent is extended or adjusted under 35 U.S.C. 154(b) by 229 days.

(21) Appl. No.: 17/232,579

(22) Filed: Apr. 16, 2021

(65) Prior Publication Data
US 2022/0337558 A1    Oct. 20, 2022

(51) Int. Cl.
H04L 9/40    (2022.01)

(52) U.S. Cl.
CPC .......... H04L 63/0281 (2013.01); H04L 63/08 (2013.01)

(58) Field of Classification Search
CPC .. H04L 63/0281; H04L 63/08; H04W 12/009; H04W 12/08
See application file for complete search history.

(56) References Cited

U.S. PATENT DOCUMENTS

| | | | | |
|---|---|---|---|---|
| 6,298,153 B1 * | 10/2001 | Oishi | ............... | H04L 9/3013 380/45 |
| 7,793,342 B1 * | 9/2010 | Ebrahimi | ............ | H04L 63/0815 726/8 |
| 8,111,718 B1 * | 2/2012 | Habib | ............... | H04W 72/0453 455/450 |
| 9,032,490 B1 * | 5/2015 | Khitrenovich | .......... | G06F 21/35 713/186 |
| 9,755,834 B1 * | 9/2017 | Johnson | ................ | H04L 9/3234 |
| 9,820,255 B1 * | 11/2017 | Demsey | ............... | H04W 4/021 |

(Continued)

FOREIGN PATENT DOCUMENTS

| | | |
|---|---|---|
| WO | 2020/053481 A1 | 3/2020 |
| WO | 2020/174121 A1 | 9/2020 |
| WO | 2020/254903 A1 | 12/2020 |

OTHER PUBLICATIONS

Extended European Search Report received for corresponding European Patent Application No. 22161229.4, dated Aug. 12, 2022, 11 pages.

(Continued)

*Primary Examiner* — Aravind K Moorthy
(74) *Attorney, Agent, or Firm* — Lippes Mathias LLP

(57) ABSTRACT

Embodiments of the present disclosure relate to methods, apparatuses and computer readable storage media for inter-network communication. A first edge protection proxy in a first network receives a request for an access token from a network repository function in the first network. The access token is to be used by a first network function in the first network to request a service from a second network function in a second network. The first edge protection proxy validates the request based on configurations allowed to access services provided by networks different from the first network. If the validation of the request is successful, the first edge protection proxy transmits the request to a second edge protection proxy in the second network. The transmitted request comprises verified information concerning the first network function.

24 Claims, 9 Drawing Sheets

(56) References Cited

U.S. PATENT DOCUMENTS

| | | | |
|---|---|---|---|
| 10,320,624 B1* | 6/2019 | Roth | G06F 21/6218 |
| 10,637,750 B1* | 4/2020 | Bollineni | H04L 63/1416 |
| 10,757,089 B1* | 8/2020 | Hohler | H04L 63/0807 |
| 10,938,816 B1* | 3/2021 | Belton, Jr. | H04L 63/0892 |
| 11,178,177 B1* | 11/2021 | O'Hara | H04L 63/1466 |
| 11,398,123 B1* | 7/2022 | Mars | G07C 9/21 |
| 2003/0200488 A1* | 10/2003 | Lloyd | H04L 63/1408 714/43 |
| 2004/0243852 A1* | 12/2004 | Rosenstein | H04L 63/123 726/4 |
| 2004/0255323 A1* | 12/2004 | Varadarajan | H04L 45/302 348/E7.073 |
| 2005/0005105 A1* | 1/2005 | Brown | H04L 63/105 713/165 |
| 2005/0005174 A1* | 1/2005 | Connors | G06F 21/31 726/19 |
| 2005/0081044 A1* | 4/2005 | Giles | H04L 63/08 726/19 |
| 2005/0137971 A1* | 6/2005 | Malcolm | G06Q 40/02 705/30 |
| 2005/0164673 A1* | 7/2005 | Ehlers | G08G 1/096866 455/404.1 |
| 2005/0207432 A1* | 9/2005 | Velez-Rivera | G06Q 30/02 370/402 |
| 2006/0130140 A1* | 6/2006 | Andreev | H04L 63/1458 726/23 |
| 2007/0143475 A1* | 6/2007 | Daigle | G06F 21/6245 709/225 |
| 2008/0022357 A1* | 1/2008 | Agarwal | H04L 63/20 726/1 |
| 2008/0155656 A1* | 6/2008 | Agosta | H04L 63/08 726/3 |
| 2009/0227274 A1* | 9/2009 | Adler | H04W 8/18 455/70 |
| 2009/0313684 A1* | 12/2009 | Shah | H04L 9/3234 726/28 |
| 2009/0320089 A1* | 12/2009 | Lyons | G06F 21/57 726/1 |
| 2010/0316035 A1* | 12/2010 | Hirano | H04W 40/24 370/338 |
| 2011/0004929 A1* | 1/2011 | Hopkins | G06Q 30/0201 726/9 |
| 2011/0225641 A1* | 9/2011 | Wu | H04L 67/146 709/227 |
| 2011/0321148 A1* | 12/2011 | Gluck | H04L 63/102 726/9 |
| 2012/0096272 A1* | 4/2012 | Jasper | H04L 63/0853 713/176 |
| 2012/0195299 A1* | 8/2012 | Liang | H04W 12/08 370/338 |
| 2013/0036476 A1* | 2/2013 | Roever | G06F 21/10 726/27 |
| 2013/0318396 A1* | 11/2013 | Plate | G06F 11/3612 714/25 |
| 2014/0068707 A1* | 3/2014 | Sakura | H04L 63/20 726/1 |
| 2014/0096202 A1* | 4/2014 | Matsuda | H04W 12/06 726/4 |
| 2014/0150066 A1* | 5/2014 | Chandolu | H04L 63/101 726/4 |
| 2014/0282990 A1* | 9/2014 | Engelhart | H04L 67/02 726/9 |
| 2014/0337955 A1* | 11/2014 | Mendelovich | H04L 63/08 726/9 |
| 2014/0366080 A1* | 12/2014 | Gupta | H04W 12/35 726/1 |
| 2015/0188919 A1* | 7/2015 | Belton, Jr. | H04L 63/0892 726/4 |
| 2015/0256514 A1* | 9/2015 | Laivand | H04L 63/105 726/3 |
| 2015/0261966 A1* | 9/2015 | Mensch | H04L 63/0876 713/189 |
| 2015/0281225 A1* | 10/2015 | Schoen | H04L 63/08 726/9 |
| 2015/0372972 A1* | 12/2015 | Kennedy | H04L 61/4511 709/245 |
| 2016/0065563 A1* | 3/2016 | Broadbent | H04L 63/0281 726/9 |
| 2016/0094363 A1* | 3/2016 | Ravi | H04L 63/08 370/401 |
| 2016/0253664 A1* | 9/2016 | Yuan | G06Q 20/3226 705/71 |
| 2016/0277413 A1* | 9/2016 | Ajitomi | G06F 21/6209 |
| 2016/0337314 A1* | 11/2016 | Yu | H04L 43/50 |
| 2017/0019314 A1* | 1/2017 | Chieu | H04L 41/5045 |
| 2017/0169292 A1* | 6/2017 | Guzman | G06Q 30/04 |
| 2017/0171293 A1* | 6/2017 | Thomassen | H04L 63/08 |
| 2017/0214683 A1* | 7/2017 | Kroehling | H04L 63/061 |
| 2018/0092011 A1* | 3/2018 | Lin | H04W 36/0016 |
| 2018/0103013 A1* | 4/2018 | Imai | H04L 63/061 |
| 2018/0109628 A1* | 4/2018 | Fransazov | H04W 12/068 |
| 2018/0255089 A1* | 9/2018 | Wilton | H04L 63/1433 |
| 2018/0278624 A1* | 9/2018 | Kuperman | G06F 21/602 |
| 2018/0302826 A1* | 10/2018 | Frederiksen | H04W 74/0833 |
| 2018/0367314 A1* | 12/2018 | Egner | H04L 9/3239 |
| 2019/0007306 A1* | 1/2019 | Kojima | G06F 9/45558 |
| 2019/0026450 A1* | 1/2019 | Egner | G06F 21/44 |
| 2019/0036923 A1* | 1/2019 | Xuan | H04L 67/141 |
| 2019/0132280 A1* | 5/2019 | Meuninck | H04L 69/325 |
| 2019/0141026 A1* | 5/2019 | Kshirsagar | H04L 63/0853 |
| 2019/0182243 A1* | 6/2019 | Tjahjono | H04W 84/22 |
| 2019/0251241 A1* | 8/2019 | Bykampadi | G06F 21/604 |
| 2019/0260803 A1* | 8/2019 | Bykampadi | H04W 12/10 |
| 2019/0268310 A1* | 8/2019 | Guberman | H04L 9/0819 |
| 2019/0324813 A1* | 10/2019 | Bogineni | G06F 9/4843 |
| 2019/0356542 A1* | 11/2019 | Chamarajnager | H04L 63/0227 |
| 2019/0373016 A1* | 12/2019 | Kitchen | H04L 63/168 |
| 2019/0394041 A1* | 12/2019 | Jain | H04L 9/3213 |
| 2020/0036526 A1* | 1/2020 | Kennedy | H04L 9/3213 |
| 2020/0053554 A1* | 2/2020 | Kim | H04W 8/24 |
| 2020/0064797 A1* | 2/2020 | Hannon | H04L 67/34 |
| 2020/0084202 A1* | 3/2020 | Smith | H04L 41/5003 |
| 2020/0106763 A1* | 4/2020 | Pancholi | H04L 9/3213 |
| 2020/0112941 A1* | 4/2020 | Yerramalli | H04W 76/40 |
| 2020/0134207 A1* | 4/2020 | Doshi | H04L 41/145 |
| 2020/0136917 A1* | 4/2020 | Kang | H04L 61/2571 |
| 2020/0145213 A1* | 5/2020 | Mohan | H04L 63/102 |
| 2020/0145402 A1* | 5/2020 | Anantha | H04W 12/06 |
| 2020/0177457 A1* | 6/2020 | Seenappa | H04L 41/0873 |
| 2020/0228316 A1* | 7/2020 | Cahill | H04L 9/3297 |
| 2020/0252383 A1* | 8/2020 | Icore | H04L 63/1483 |
| 2020/0304495 A1* | 9/2020 | Albertson | H04L 63/0853 |
| 2020/0329062 A1* | 10/2020 | Beauchesne | H04L 63/105 |
| 2020/0336322 A1* | 10/2020 | Asanghanwa | H04L 41/5051 |
| 2020/0351274 A1* | 11/2020 | Damour | G06F 9/5005 |
| 2020/0358909 A1* | 11/2020 | Ahmadi | H04L 65/1016 |
| 2020/0367045 A1* | 11/2020 | Jeong | H04W 36/12 |
| 2021/0004491 A1* | 1/2021 | Saha | H04W 12/03 |
| 2021/0068172 A1* | 3/2021 | Jeong | H04W 24/02 |
| 2021/0092673 A1* | 3/2021 | Young | H04W 4/029 |
| 2021/0136715 A1* | 5/2021 | Jeong | H04W 48/18 |
| 2021/0144133 A1* | 5/2021 | Allo | H04L 63/0428 |
| 2021/0209218 A1* | 7/2021 | Watson | H04L 9/0825 |
| 2021/0227038 A1* | 7/2021 | Mitsov | H04L 43/08 |
| 2021/0248025 A1* | 8/2021 | Nair | G06F 11/0772 |
| 2021/0256421 A1* | 8/2021 | Sundaresan | H04L 63/1458 |
| 2021/0336845 A1* | 10/2021 | Kumble Seetharama | H04L 41/0859 |
| 2021/0336966 A1* | 10/2021 | Gujarathi | H04L 9/3213 |
| 2022/0007437 A1* | 1/2022 | Goenka | H04L 67/141 |
| 2022/0027192 A1* | 1/2022 | Nikain | G06F 9/4843 |
| 2022/0046058 A1* | 2/2022 | Sampathkumar | H04L 67/1044 |
| 2022/0051250 A1* | 2/2022 | Vargas | G06Q 20/341 |
| 2022/0086253 A1* | 3/2022 | Newton | H04L 67/1001 |
| 2022/0103545 A1* | 3/2022 | Hebert | H04L 63/083 |
| 2022/0124022 A1* | 4/2022 | Shenbagam | H04L 45/22 |
| 2022/0158847 A1* | 5/2022 | Aggarwal | H04L 9/3247 |
| 2022/0159464 A1* | 5/2022 | Rajput | H04W 28/12 |
| 2022/0164795 A1* | 5/2022 | Yang | H04L 9/3231 |
| 2022/0173886 A1* | 6/2022 | Sardesai | H04L 9/0819 |

(56) References Cited

U.S. PATENT DOCUMENTS

2022/0173901 A1* 6/2022 Garcia Valenzuela ........................ H04L 63/10
2022/0286949 A1* 9/2022 Sapra .................... H04W 48/18
2022/0294767 A1* 9/2022 Scali ...................... H04L 63/04
2022/0295282 A1* 9/2022 Rajput ................ H04L 63/0281
2022/0337558 A1* 10/2022 Khare .................... H04L 63/08

OTHER PUBLICATIONS

"3rd Generation Partnership Project; Technical Specification Group Services and System Aspects; Security architecture and procedures for 5G system (Release 17)", 3GPP TS 33.501, V17.1.0, Mar. 2021, pp. 1-256.
"3rd Generation Partnership Project;Technical Specification Group Services and System Aspects;Security architecture and procedures for 5G system(Release 17)", 3GPP TS 33.501, V17 0.0, Dec. 2020, pp. 1-253.
"3rd Generation Partnership Project;Technical Specification Group Services and System Aspects; Study on enhanced security aspects of the 5G Service Based Architecture (SBA); (Release 17)", 3GPP TR 33.875, V0.1.0, Jan. 2021, pp. 1-12.
"3rd Generation Partnership Project;Technical Specification Group Core Network and Terminals;5G System; Network Function Repository Services; Stage 3 (Release 17)", 3GPP TS 29.510, V17.0.0, Dec. 2020, pp. 1-229.
Finnish Application No. 20215183, "Enhanced Authorization in Cellular Communication Networks", filed on Feb. 19, 2021, 29 pages.
Indian Application No. 202041031350, "Service Authorization in Communication Systems", filed on Jul. 22, 2020, 45 pages.
"3rd Generation Partnership Project;Technical Specification Group Core Network and Terminals;5G System; Technical Realization of Service Based Architecture;Stage 3 (Release 17)", 3GPP TS 29.500, V17.1.0, Dec. 2020, pp. 1-90.
"LS on Identification of source PLMN-ID in SBA", 3GPP TSG-CT WG4 Meeting #101-bis-e, C4-210249, CT4, Jan. 25-29, 2021, 2 pages.
"LS on Identification of source PLMN-ID in SBA", 3GPP TSG-SA3 Meeting #102Bis-e, S3-210812, Agenda : 2.20, 3GPP CT4, Mar. 1-5, 2021, 2 pages.

* cited by examiner

SECURITY ENHANCEMENT ON INTER-NETWORK COMMUNICATION

TECHNICAL FIELD

Embodiments of the present disclosure generally relate to the field of telecommunication, and in particular, to apparatuses, methods and computer readable storage media for inter-network communication.

BACKGROUND

Using the fifth generation (5G) network, not only more humans are getting connected for their private and/or public uses, but also machines, robots, cars and/or devices will use the 5G network for their critical communications. To meet all of the requirements, the 5G core network (5GC) is designed to be extremely secure.

A network function (NF) acting as a service consumer (which may be referred to as "NF service consumer" or "NFc" in the following) may request a service from a NF acting as a service producer (also referred to as "NF service producer" or "NFp" in the following). To access the requested service, an access token is provided by a network repository function (NRF) to the NFc to prevent unauthorized access. If the NFc and the NFp are located in different networks, obtaining of the access token involves communication between NRFs in different networks.

SUMMARY

In general, example embodiments of the present disclosure provide apparatuses, methods and computer readable storage media for inter-network communication.

In a first aspect, there is provided an apparatus. The apparatus comprises at least one processor; and at least one memory including computer program codes; the at least one memory and the computer program codes are configured to, with the at least one processor, cause the apparatus to receive, at a first edge protection proxy in a first network, a request for an access token from a network repository function in the first network, the access token to be used by a first network function in the first network to request a service from a second network function in a second network; validate the request based on configurations allowed to access services provided by networks different from the first network; and in accordance with a successful validation of the request, transmit the request to a second edge protection proxy in the second network, the transmitted request comprising verified information concerning the first network function.

In a second aspect, there is provided an apparatus. The apparatus comprises at least one processor; and at least one memory including computer program codes; the at least one memory and the computer program codes are configured to, with the at least one processor, cause the apparatus to receive, at a second edge protection proxy in a second network, a request for an access token from a first edge protection proxy in a first network, the access token to be used by a first network function in the first network to request a service from a second network function in the second network, the request comprising verified information concerning the first network function; and transmit the request to a network repository function in the second network.

In a third aspect, there is provided an apparatus. The apparatus comprises at least one processor; and at least one memory including computer program codes; the at least one memory and the computer program codes are configured to, with the at least one processor, cause the apparatus to receive, at a network repository function in a second network, a request for an access token from an edge protection proxy in the second network, the access token to be used by a first network function in a first network to request a service from a second network function in the second network; determine whether the first network function is authorized to access the requested service based on verified information concerning the first network function comprised in the request; and in accordance with a determination that the first network function is authorized, provide the access token to the first network function.

In a fourth aspect, there is provided an apparatus. The apparatus comprises at least one processor; and at least one memory including computer program codes; the at least one memory and the computer program codes are configured to, with the at least one processor, cause the apparatus to receive, at a network repository function in a first network, a request for an access token from a first network function in the first network, the access token to be used by the first network function to request a service from a second network function in a second network; verify information concerning the first network function comprised in the request based on a profile of the first network function; add the verified information concerning the first network function into the request; and transmit the request comprising the verified information to an edge protection proxy in the first network.

In a fifth aspect, there is provided a method. The method comprises receiving, at a first edge protection proxy in a first network, a request for an access token from a network repository function in the first network, the access token to be used by a first network function in the first network to request a service from a second network function in a second network; validating the request based on configurations allowed to access services provided by networks different from the first network; and in accordance with a successful validation of the request, transmitting the request to a second edge protection proxy in the second network, the transmitted request comprising verified information concerning the first network function.

In a sixth aspect, there is provided a method. The method comprises receiving, at a second edge protection proxy in a second network, a request for an access token from a first edge protection proxy in a first network, the access token to be used by a first network function in the first network to request a service from a second network function in the second network, the request comprising verified information concerning the first network function; and transmitting the request to a network repository function in the second network.

In a seventh aspect, there is provided a method. The method comprises receiving, at a network repository function in a second network, a request for an access token from an edge protection proxy in the second network, the access token to be used by a first network function in a first network to request a service from a second network function in the second network; determining whether the first network function is authorized to access the requested service based on verified information concerning the first network function comprised in the request; and in accordance with a determination that the first network function is authorized, providing the access token to the first network function.

In an eighth aspect, there is provided a method. The method comprises receiving, at a network repository function in a first network, a request for an access token from a first network function in the first network, the access token to be used by the first network function to request a service from a second network function in a second network; verifying information concerning the first network function comprised in the request based on a profile of the first network function; adding the verified information concerning the first network function into the request; and transmitting the request comprising the verified information to an edge protection proxy in the first network.

In a ninth aspect, there is provided an apparatus. The apparatus comprises means for receiving, at a first edge protection proxy in a first network, a request for an access token from a network repository function in the first network, the access token to be used by a first network function in the first network to request a service from a second network function in a second network; means for validating the request based on configurations allowed to access services provided by networks different from the first network; and means for in accordance with a successful validation of the request, transmitting the request to a second edge protection proxy in the second network, the transmitted request comprising verified information concerning the first network function.

In a tenth aspect, there is provided an apparatus. The apparatus comprises means for receiving, at a second edge protection proxy in a second network, a request for an access token from a first edge protection proxy in a first network, the access token to be used by a first network function in the first network to request a service from a second network function in the second network, the request comprising verified information concerning the first network function; and means for transmitting the request to a network repository function in the second network.

In an eleventh aspect, there is provided an apparatus. The apparatus comprises means for receiving, at a network repository function in a second network, a request for an access token from an edge protection proxy in the second network, the access token to be used by a first network function in a first network to request a service from a second network function in the second network; means for determining whether the first network function is authorized to access the requested service based on verified information concerning the first network function comprised in the request; and means for in accordance with a determination that the first network function is authorized, providing the access token to the first network function.

In a twelfth aspect, there is provided an apparatus. The apparatus comprises means for receiving, at a network repository function in a first network, a request for an access token from a first network function in the first network, the access token to be used by the first network function to request a service from a second network function in a second network; means for verifying information concerning the first network function comprised in the request based on a profile of the first network function; means for adding the verified information concerning the first network function into the request; and means for transmitting the request comprising the verified information to an edge protection proxy in the first network.

In a thirteenth aspect, there is provided a non-transitory computer readable medium comprising program instructions for causing an apparatus to perform at least the method according to the above fifth aspect.

In a fourteenth aspect, there is provided a non-transitory computer readable medium comprising program instructions for causing an apparatus to perform at least the method according to the above sixth aspect.

In a fifteenth aspect, there is provided a non-transitory computer readable medium comprising program instructions for causing an apparatus to perform at least the method according to the above seventh aspect.

In a sixteenth aspect, there is provided a non-transitory computer readable medium comprising program instructions for causing an apparatus to perform at least the method according to the above eighth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
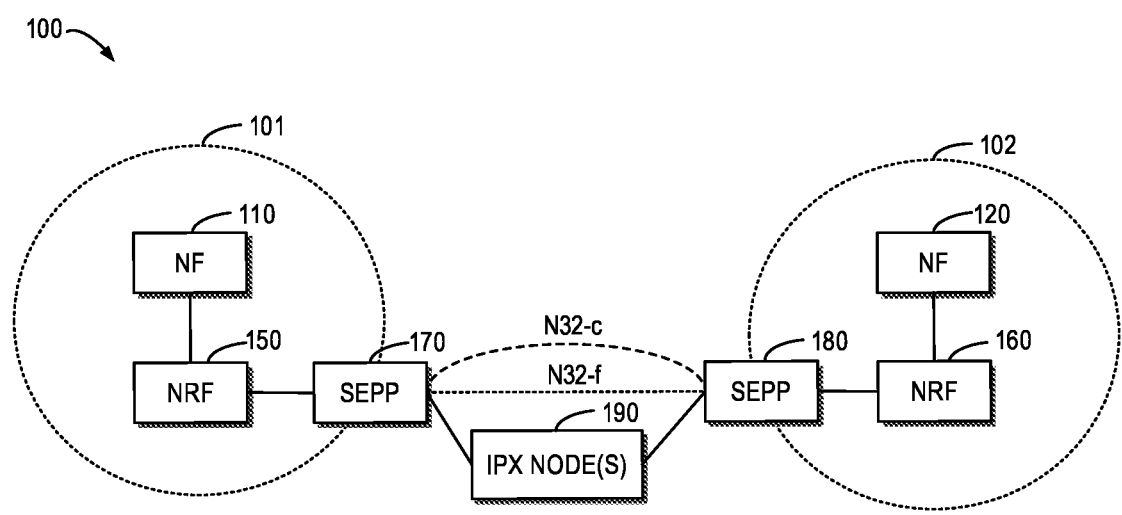
FIG. 1 illustrates a block diagram of an example environment in which some example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on.

Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the NRF is a network function which maintains NF profiles and available NF instances. The NRF can also provide service registration and discovery functionalities such that NFs can discover each other.

Example Environment and Working Principle

Principle and implementations of the present disclosure will be described in detail below with reference to the accompanying drawings. Reference is now made to FIG. 1. FIG. 1 illustrates a block diagram of an environment 100 in which some example embodiments of the present disclosure can be implemented. FIG. 1 illustrates an example environment 100 for a Service Based Architecture (SBA) roaming scenario.

Generally, the environment 100 includes two networks 101 and 102, which may be two Public Land Mobile Networks (PLMNs). For example, the networks 101 and 102 may be operated by different operators. The network 101 (also referred to as "first network 101") includes a NF 110, a NRF 150 and a Security Edge Protection Proxy (SEPP) 170. The NRF 150 maintains a NF profile of the NF 110 and also provides service registration and discovery functionalities to the NF 110. The SEPP 170 is located at the edge of the network 101 and protects the network 101 against unwanted traffic from other networks.

Similarly, the network 102 (also referred to as "second network 102") includes a NF 120, a NRF 160 and a SEPP 180. The NRF 160 maintains a NF profile of the NF 120 and also provides service registration and discovery functionalities to the NF 120. The SEPP 180 is located at the edge of the network 102 and protects the network 102 against unwanted traffic from other networks.

In some example embodiments, the SEPPs 170 and 180 can communicate with each other via a N32 interface, for example, a N32-c connection or a N32-f connection. Alternatively, or in addition, the SEPPs 170 and 180 can communicate with each other via one or more Internet Protocol exchange Service (IPX) node(s) 190.

In some example embodiments, the NF 110 may act as a service consumer, which may request a service from the NF 120 acting as a service producer. Only for the purpose of illustration, in the following, the NF 110 is also referred to as "NFc 110" or "first NF 110", and the NF 120 is also referred to as "NFp 120" or "second NF 120".

In the roaming scenario, the network 101 may be a visited or serving PLMN and thus may also be referred to as "vPLMN 101" merely for the purpose of illustration. The network 102 may be a home PLMN or a service request receiving and processing PLMN and thus may also be referred to as "hPLMN 102" merely for the purpose of illustration. Accordingly, the NRF 150 in the network 101 may also be referred to as "vNRF 150" and the NRF 160 in the network 102 may also be referred to as "hNRF 160".

As mentioned above, unauthorized service access needs to be prevented for the purpose of security. OAuth 2.0 is a key technology and widely used for NF service access authorization in 5G SBA. It allows NF service producers to authorize service requests from NF service consumers. When a NFc requests to access or consume a service provided by a NFp, the NFc needs to request an access token from an OAuth 2.0 authorization server (for example, a NRF). If the NFc is authorized to access the service of the NFp, the OAuth 2.0 authorization server returns an access token. The NFc then includes the access token in its service request towards the NFp. The NFp will verify the access token received from the NFc.

Figure 2:
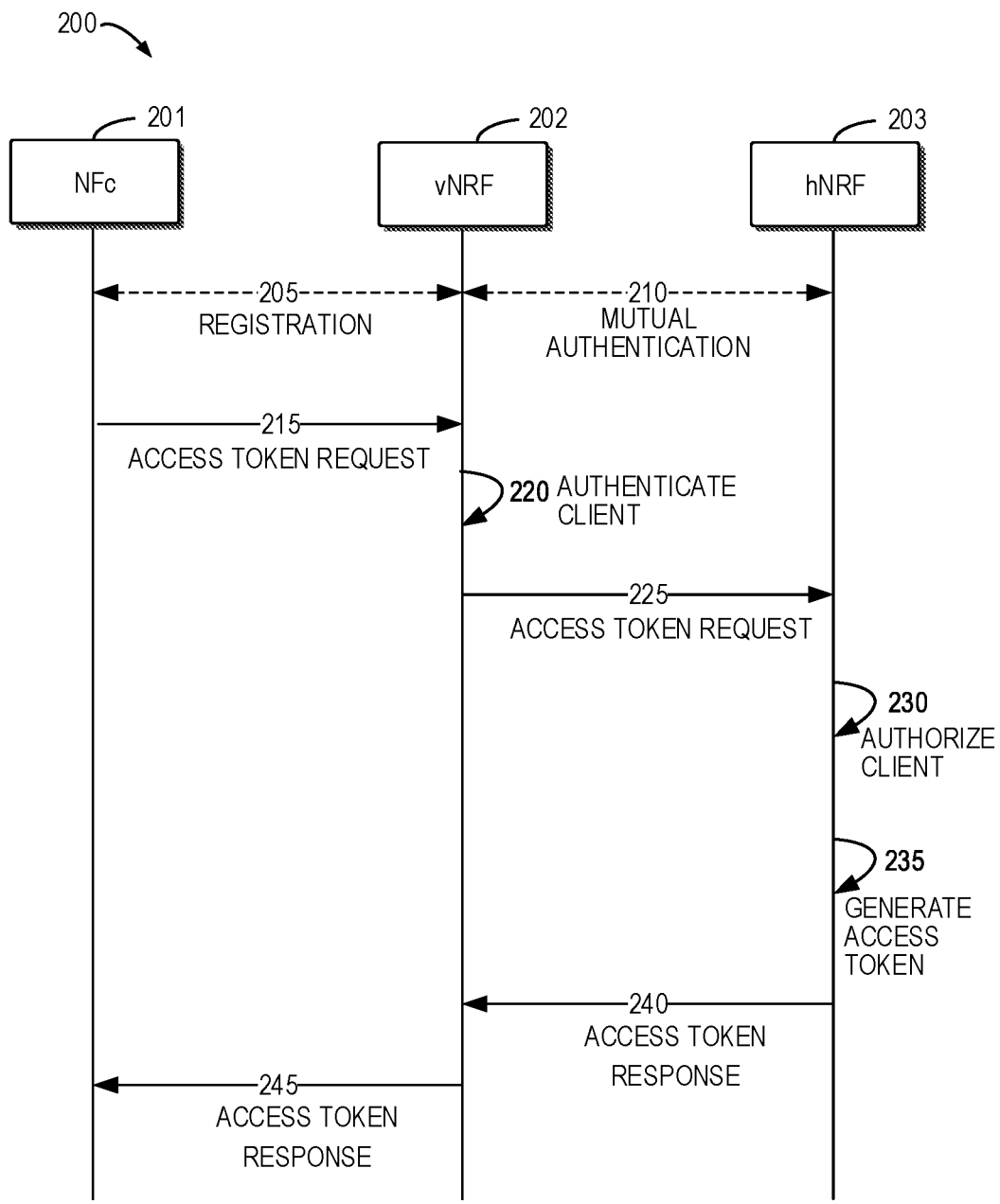
FIG. 2 illustrates an interaction diagram of a process for obtaining an access token before NF service access in a roaming scenario.

In the roaming scenario, if a NFc in a vPLMN expects to access a service provided by a NFp in a hPLMN, the NFc needs to obtain an access token independently before accessing the service. Reference is now made to FIG. 2. FIG. 2 illustrates an interaction diagram of a process 200 for obtaining an access token before NF service access in the roaming scenario.

As shown in FIG. 2, a registration procedure is performed 205 between a NFc 201 and a vNRF 202, which is located in the same PLMN as the NFc 202. As such, the NFc 201 acting as an OAuth2.0 client is registered with the vNRF 202 acting as an authorization server in the vPLMN. In some scenarios, this (client) registration is optional. Similarly, a NFp (not shown in FIG. 2) acting as an OAuth2.0 resource server is registered with the hNRF 203 acting as an authorization server in the hPLMN. The vNRF 202 and vNRF 203 may mutually authenticate 210 each other.

The NFc 201 expects to access a service provided by the NFp in the hPLMN. The NFc 201 transmits 215 a request for an access token (which is also referred to as "access token request") to the vNRF 202. The access token request includes information related to the NFc 201 and the expected service. For example, the NFc 201 may invoke Nnrf_AccessToken_Get Request. The Nnrf_AccessToken_Get Request may include NF Instance ID of the NFc 201, the requested "scope" including the expected NF Service Name(s) and optionally "additional scope" information (i.e. requested resources and requested actions (service operations) on the resources, NF Type of the expected NFp instance, NF type of the NFc 201, home and serving PLMN IDs, optionally list of Network Slice Selection Assistance Information (NSSAIs) or list of network slice instance (NSI) IDs for the expected NF Service Producer instances, optionally NF Set ID of the expected NFp.

The vNRF 202 authenticates 220 the NFc 201 acting as the OAuth2.0 client. Then, the vNRF 202 identifies the hNRF 203 in the hPLMN based on the home PLMN ID included in the access token request. The vNRF 202 transmits 225 the access token request to the hNRF 203 to request an access token from hNRF 203.

The hNRF 203 authorizes 230 the NFc 201. Specifically, the hNRF 203 may check whether the NFc 201 is authorized to access the requested service(s). If the NFc 201 is authorized, the hNRF 203 generates 235 an access token with appropriate claims. The hNRF 230 may digitally sign the generated access token based on a shared secret or private key. That is, the authorization is successful.

The hNRF 203 transmits 240 an access token response including the generated access token to the vNRF 202. For example, Nnrf_AccessToken_Get Response including the access token is transmitted to the vNRF 202. The vNRF 202 then transmits the access token response to the NFc 201. The NFc 201 may store the received access token(s) for accessing service(s) from the NFp.

If the authorization by the hNRF 203 is unsuccessful, or in other words, if the NFc 201 is not authorized, the hNRF 203 may not issue an access token to the NFc 201. In this case, the hNRF 203 transmits an OAuth 2.0 error response to the vNRF 202, which forwards the OAuth 2.0 error response to the NFc 201.

The NFc 201 is connected or registered to the NRFc, which is the vNRF 202 in FIG. 2. Therefore, the vNRF 202 knows the details of the NFc 201. The vNRF 202 can validate the requester (the NFc 201) side parameters provided in the access token request.

Table 1 shows an example of the Access Token application programing interface (API) where the requester side parameters are available. In Table 1, the abbreviation "S-NSSAI" is short for "single NSSAI". The abbreviation "FQDN" is short for "Fully Qualified Domain Name" and the abbreviation "SNPN" is short for "Standalone Non-Public Network".

TABLE 1 an example of the Access Token API

| Attribute name | Data type | P | Cardinality | Description |
| --- | --- | --- | --- | --- |
| nfInstanceId | NfInstanceId | M | 1 | This IE shall contain the NF instance id of the NF service consumer. |
| requesterPlmn | PlmnId | C | 0 . . . 1 | This IE shall be included when the NF service consumer in one PLMN requests a service access authorization for an NF service producer from a different PLMN.<br>When present, this IE shall contain the PLMN ID of the requester NF service consumer. |
| requesterPlmnList | array(PlmnId) | C | 2 . . . N | This IE shall be included when the NF service consumer serving a PLMN, with more than one PLMN ID, requests a service access authorization for an NF service producer from a different PLMN.<br>When present, this IE shall contain the PLMN IDs of the requester NF service consumer. |

TABLE 1-continued an example of the Access Token API

| Attribute name | Data type | P | Cardinality | Description |
|---|---|---|---|---|
| requesterSnssaiList | array(Snssai) | O | 1 . . . N | When present, this IE shall contain the list of S-NSSAIs of the requester NF service consumer. This may be used by the NRF to validate that the requester NF service consumer is allowed to access the target NF Service Producer. |
| requesterFqdn | Fqdn | O | 0 . . . 1 | When present, this IE shall contain the FQDN of the requester NF Service Consumer. This may be used by the NRF to validate that the requester NF service consumer is allowed to access the target NF Service Producer. |
| requesterSnpnList | array(PlmnIdNid) | O | 1 . . . N | When present, this IE shall contain the list of SNPNs the requester NF service consumer belongs to. This may be used by the NRF to validate that the requester NF service consumer is allowed to access the target NF Service Producer. |
| Etc | | | | There can be more parameters added which are related to the NFc. |

However, the Access Token API is served by the NRFp where NFp profile is provisioned. In the roaming scenario, the NRFp, which is the hNRF 203 is located in a different PLMN.

As can be seen from the above process 200, the NFc 201 adds parameters related to the NFc 201 in the access token request transmitted 215 to the hNRF 203 via vNRF 202. The parameters related to the NFc 201 include for example NF instance ID, requester PLMN list, requester SNPN list, etc. However, when the hNRF 203 authorize 230 the NFc 201, there is no NF profile of the NFc 201 in the hNRF 203. Therefore, the hNRF 203 cannot validate the parameters related to the NFc 201. For example, the hNRF 203 cannot validate the following parameters of the NFc 201 available in the access token request: the NF type, PLMN ID, SNPN ID, Requester NF Set ID, Requester NF Service Set ID, Vendor ID, and Domain ID, etc.

In view of the foregoing, when a NFc in a network expects to access a service from a NFp in another network, inter-network communication such as inter-PLMN communication is involved. In this case, a problem that the NRFp (that is, the hNRF) cannot validate the requester (that is the NFc) side parameters available in the Access Token API, which is in a different network needs to be solved. In other words, there is a need for a mechanism to enable the hNRF to trust the requester side parameters provided by the vNRF.

Embodiments of the present disclosure provide a solution for communication between NRFs in different networks. In this solution, a NFc located in a first network expects to access a service provided by a NFp in a second network different from the first network. The NFc transmits a request for an access token (which is also referred to as an access token request) to a vNRF in the first network. The access token is to be used by the NFc to request the service from the NFp. The vNRF forwards the request to a vSEPP in the first network. The request includes information concerning the NFc. At least one of the vNRF and the vSEPP verifies the information and adds the verified information into the request. For example, a custom header including the verified information may be inserted into the request. After successful validation of the request by the vSEPP, the request including the verified information concerning the NFc is transmitted to a hSEPP in the second network. After successful validation of the request by the hSEPP, the request is forwarded to a hNRF in the second network where the NFp is registered. The hNRF serves the NFp. The hNRF authorizes the NFc based on the verified information in the request. If the NFc is authorized, the hNRF generates the access token and provide the access token to the NFc.

According to the embodiments of the present disclosure, the hNRF can trust the NFc related information available in the access token request coming from the vNRF and vSEPP without knowing the NF profile of the NFc. In this way, the NFc can be authorized to the NFp in inter-network scenario.

An Example Process for Inter-Network Communication

Figure 3:
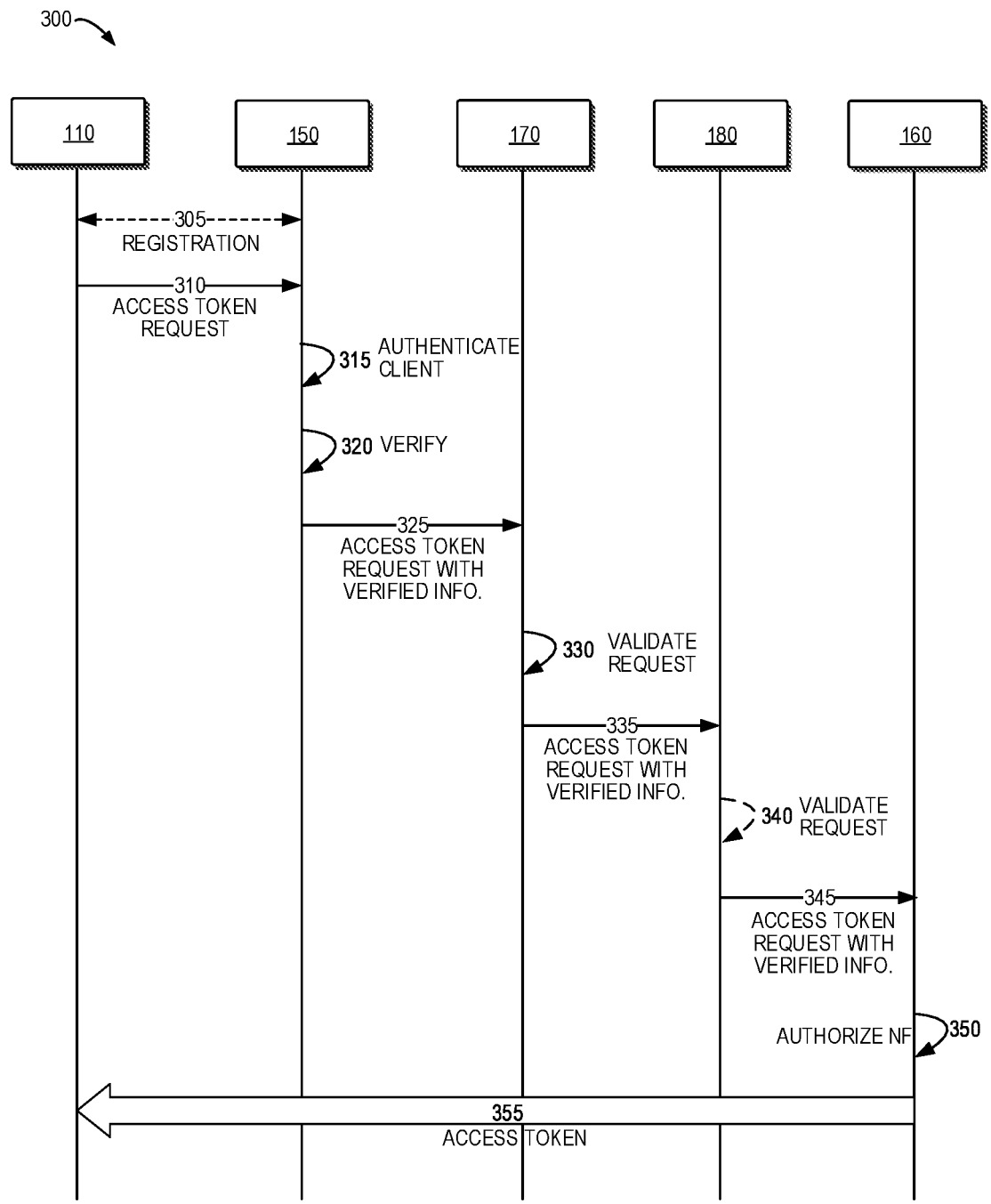
FIG. 3 illustrates an interaction diagram of an example process for obtaining an access token through inter-network communication according to some example embodiments of the present disclosure.

FIG. 3 illustrates an interaction diagram of an example process 300 for obtaining an access token through inter-network communication according to some example embodiments of the present disclosure. As shown in FIG. 3, the process 300 may involve the NFc 110, the vNRF 150, the vSEPP 170, the hSEPP 180, and the hNRF 160 as shown in FIG. 1.

In some example embodiments, a registration procedure may be performed 305 between the NFc 110 and the vNRF 150, which is located in the same network as the NFc 110. In other words, the NFc 110 acting as an OAuth2.0 client is registered with the vNRF 150 acting as an authorization server in the first network 101. Alternatively, in some example embodiments, the NFc 110 may not register in the vNRF 150.

The NFc 110 expects to access a service provided by the NFp 120 in the network 102. Accordingly, the NFc 110 transmits 310 a request for an access token (which is also referred to as "access token request") to the vNRF 150. The access token request includes information concerning the NFc 110 and information concerning the expected service from the NFp 120. The information concerning the NFc 110 may comprise one or more parameters related to the NFc 110, including but not limited to, a NF type, a PLMN ID, a SNPN ID, a NF set ID, a vendor ID, and a domain ID of the NFc 110. The information concerning the expected service from the NFp 120 may include, but not limited to, the requested "scope", a NF Type, and a PLMN ID of the NFp 120.

As an example, the NFc 110 may transmit the Nnrf_AccessToken_Get Request to the vNRF 150. The Nnrf_AccessToken_Get Request may include a NF Instance ID of the NFc 110, the requested "scope" including the expected NF Service Name(s), a NF type of the NFc 110, a home PLMN ID which is the PLMN ID of the NFp 120, and a serving PLMN ID which is the PLMN ID of the NFc 110, a vendor ID of the NFc 110, and a domain ID (e.g., FQDN) of the NFc 110. The Nnrf_AccessToken_Get Request may optionally include "additional scope" information (i.e. requested resources and requested actions (service operations) on the resources, a list of NSSAIs or a list of NSI IDs for the expected NF Service Producer instances, NF Set ID of the expected NFp, and a NF Type of the expected NFp instance.

Upon receiving the access token request, the vNRF 150 authenticates 315 the NFc 110 acting as the OAuth2.0 client. Then, the vNRF 150 verifies 320 the information concerning the NFc 110 based on a NF profile of the NFc 110. For example, the vNRF 150 may read the one or more parameters related to the NFc 110 from the access token request. The vNRF 150 may further verify whether the one or more parameters available in the access token request are matched with corresponding parameters in the NF profile of the NFc 110.

The vNRF 150 adds the verified information concerning the NFc 110 into the access token request. The verified information may comprise the one or more parameters related to the NFc 110 and corresponding verification result. If a specific parameter in the access token request is matched with a corresponding parameter in the NF profile of the NFc 110, the verification result can be represented by "true" or "yes". If the specific parameter in the access token request is not matched with the corresponding parameter in the NF profile of the NFc 110, the verification result can be represented by "false" or "no".

The verified information concerning the NFc 110 may comprise the NF type of the NFc 110 and a verification result of the NF type. Alternatively, or in addition, the verified information may comprise the PLMN ID of the NFc 110 and a verification result of the PLMN ID. For example, the PLMN ID may be an ID of the first network 101. Alternatively, or in addition, the verified information may comprise the SNPN ID of the NFc 110 and a verification result of the SNPN ID. Alternatively, or in addition, the verified information may comprise the NF set ID of the NFc 110 and a verification result of the NF set ID. Alternatively, or in addition, the verified information may comprise the service set ID of the NFc 110 and a verification result of the service set ID. Alternatively, or in addition, the verified information may comprise the vendor ID of the NFc 110 and a verification result of the vendor ID. Alternatively, or in addition, the verified information may comprise the domain ID of the NFc 110 and a verification result of the domain ID. For example, the domain ID may be a FQDN of the NFc 110.

It is to be understood that the above parameters related to the NFc 110 are given for the purpose of illustration without any limitation, and there can be more parameters of the NFc 110 which can be added here. The verified information concerning the NFc 110 can comprise any suitable parameter related to the NFc 110 and a respective verification result. The verification results indicate that the vNRF 150 has validated the parameters via the NF profile of the NFc 110. In this way, a higher level of confidence can be provided to the vSEPP 170.

In some example embodiments, the vNRF 150 may generate a header comprising the verified information and add the header into the access token request. For example, a custom header named "3GPP_SBI_NFc" may be added into the access token request by the vNRF 150. The custom header may include one or more fields representing the one or more parameters related to the NFc 110 and corresponding verification results. Table 2 shows example fields of the custom header.

TABLE 2 example fields of the custom header

| Field Name | Field Value |
| --- | --- |
| 3GPP_SBI_NFc_Requester_PLMNID | xyz, validatedBy NRF = True/False |
| 3GPP_SBI_NFc_Requester_SNPN_ID | ijk, validatedBy NRF = True/False |
| 3GPP_SBI_NFc_Requester_NFtype: | nft, validatedBy NRF = True/False |
| 3GPP_SBI_NFc_Requester_RequestSetId: | abc, validatedBy NRF = True/False |
| 3GPP_SBI_NFc_Requester_RequestServiceSetId: | bcd, validatedBy NRF = True/False |
| 3GPP_SBI_NFc_Requester_Vendor_ID: | jkl, validatedBy NRF = True/False |
| 3GPP_SBI_NFc_Requester_Domain_ID: | klm, validatedBy NRF = True/False |

As shown in Table 2, the "3GPP_SBI_NFc_Requester_PLMNID" field represents a value "xyz" of the PLMN ID of the NFc 110 and its verification result "True" or "False". The "3GPP_SBI_NFc_Requester_SNPN_ID" field represents a value "ijk" of the SNPN ID of the NFc 110 and its verification result "True" or "False". The "3GPP_SBI_NFc_Requester_NFtype" field represents a value "nft" of the NF type of the NFc 110 and its verification result "True" or "False". The "3GPP_SBI_NFc_Requester_RequestSetId" field represents a value "abc" of the NF set ID of the NFc 110 and its verification result "True" or "False". The "3GPP_SBI_NFc_Requester_RequestServiceSetId" field represents a value "bcd" of the service set ID of the NFc 110 and its verification result "True" or "False". The "3GPP_SBI_NFc_Requester_Vendor_ID" field represents a value "jkl" of the vendor ID of the NFc 110 and its verification result "True" or "False". The "3GPP_SBI_NFc_Requester_Domain_ID" field represents a value "klm" of the domain ID of the NFc 110 and its verification result "True" or "False".

It is to be understood that the above field shown in Table 2 are given for the purpose of illustration without any limitation. The header can comprise any suitable field to represent the one or more parameters related to the NFc 110. It is also to be understood that more than one header may be used.

Continuing with the process 300, the vNRF 150 transmits 325 the access token request with the verified information concerning the NFc 110 to the vSEPP 170 located at the edge of the first network 101. For example, the vNRF 150 may transmit the access token request comprising the header "3GPP_SBI_NFc" to the vSEPP 170.

The vSEPP 170 validates 330 the access token request received from the vNRF 150. Specifically, the vSEPP 170 validates the verified information in the access token request based on configurations allowed to access services provided by other networks. For example, the allowed configurations may be specified by an operator policy for the first network 101.

In some example embodiments, the operator policy may specify a configuration of allowed NF types. That is, a NFc of an allowed NF type can access services from another network. For example, the operator policy may specify that an Access and Mobility Management Function (AMF) in the local network (which is the first network 101) is allowed to access a Unified Data Management (UDM) in a remote network, for example, the second network 102. As another example, the operator policy may specify that an Authentication Server Function (AUSF) in the local network is not allowed to access the UDM in the remote network.

Alternatively, or in addition, in some example embodiments, the operator policy may specify a configuration of allowed home PLMN IDs. For example, a list of the allowed home PLMN IDs may be maintained by the vSEPP 170. If the home PLMN ID comprised in the access token request is matched with an entry in the list of the allowed home PLMN IDs, the NFc 110 may be allowed to access the service of the NFp 120.

Alternatively, or in addition, in some example embodiments, the operator policy may specify a configuration of allowed home SNPN IDs. For example, a list of the allowed home SNPN IDs may be maintained by the vSEPP 170. If the home SNPN ID comprised in the access token request is matched with an entry in the list of the allowed home SNPN IDs, the NFc 110 may be allowed to access the service of the NFp 120.

Alternatively, or in addition, in some example embodiments, the operator policy may specify a configuration of allowed NF set IDs. For example, in the case where the access token request comprises a NF set ID of the NFc 110, a list of the allowed NF set IDs may be maintained by the vSEPP 170. If the NF set ID of the NFc 110 comprised in the access token request is matched with an entry in the list of the allowed NF set IDs, the NFc 110 may be allowed to access the service of the NFp 120.

Alternatively, or in addition, in some example embodiments, the operator policy may specify a configuration of allowed service set IDs. For example, in the case where the access token request comprises a service set ID of the NFc 110, a list of the allowed service set IDs may be maintained by the vSEPP 170. If the service set ID of the NFc 110 comprised in the access token request is matched with an entry in the list of the allowed service set IDs, the NFc 110 may be allowed to access the service of the NFp 120.

Alternatively, or in addition, in some example embodiments, the operator policy may specify a configuration of allowed vendor IDs. For example, in the case where the access token request comprises a vendor ID of the NFc 110, a list of the allowed vendor IDs may be maintained by the vSEPP 170. If the vendor ID of the NFc 110 comprised in the access token request is matched with an entry in the list of the allowed vendor IDs, the NFc 110 may be allowed to access the service of the NFp 120.

Alternatively, or in addition, in some example embodiments, the operator policy may specify a configuration of allowed domain IDs. For example, in the case where the access token request comprises a domain ID of the NFc 110, a list of the allowed domain IDs may be maintained by the vSEPP 170. If the domain ID of the NFc 110 comprised in the access token request is matched with an entry in the list of the allowed domain IDs, the NFc 110 may be allowed to access the service of the NFp 120.

It is to be understood that the above allowed configurations are given for the purpose of illustration without any limitation. The vSEPP 170 can validate the access token request based on any suitable allowed configuration, for example, as specified by the operator policy. Alternatively, to validate the access token request, the vSEPP 170 can read a required parameter (for example, the home PLMN ID, home SNPN ID, etc.) from the access token request. A parameter required to validate the access token request can be obtained from the customer header, or a body of the request, or both.

A successful validation of the access token request by the vSEPP 170 can be defined in any suitable manner. As an example, if all configurations indicated by the parameters in the access token request belong to the allowed configurations specified by the operator policy, the validation of the access token request is successful. In other words, in this case, if a configuration indicated by indicated by the parameters in the access token request does not belong to the allowed configurations, the validation of the access token request is unsuccessful. As another example, if a threshold number of configurations indicated by the parameters in the access token request belong to the allowed configurations the validation of the access token request is successful. The protection scope of the present disclosure is not limited in the definition of successful validation of the access token request.

If the validation of the access token request by the vSEPP 170 is unsuccessful, it means that the NFc 110 is not allowed to access the expected service. In this case, the vSEPP 170 may provide a rejection response to the NFc 110 to indicate that the access token request is rejected. Specifically, the vSEPP 170 may transmit the rejection response to the vNRF 150, which forwards the rejection response to the NFc 110.

If the validation of the access token request by the vSEPP 170 is successful, the vSEPP 170 transmits 335 the access token request with the verified information concerning the NFc 110 to the hSEPP 180 located at the edge of the second network 102. For example, the vSEPP 170 may transmit the access token request comprising the header "3GPP_S-BI_NFc" to the hSEPP 180.

In some example embodiments, the vSEPP 170 may sign the verified information. For example, the vSEPP 170 may generate a signature based on the verified information and transmit the access token request comprising the verified information and the signature of the vSEPP 170. In the case where the verified information is comprised in the custom header, the vSEPP 170 may sign the custom header.

Signing the verified information by the vSEPP 170 ensures that the content provided by the vNRF 150 is validated by the vSEPP 170. Since the vSEPP 170 and the hSEPP 180 have a trust relation by N32 security, the vSEPP 170 and the hSEPP 180 are the end-to-end security points in the roaming scenario. Thus, information received from the vSEPP 170 is to be trusted by the hSEPP 180.

In some example embodiments, upon receiving the access token request, the hSEPP 180 may validate 340 the access token request. Specifically, the hSEPP 180 validates the verified information in the access token request based on configurations allowed to access services provided by the second network 102. For example, the allowed configurations may be specified by an operator policy for the second network 102.

In some example embodiments, the operator policy may specify a configuration of allowed NF types. That is, a NFc of an allowed NF type can access the services provided by the second network 102. For example, the operator policy may specify that an AMF in another network (which is the first network 101) is allowed to access a UDM in the second network 102. As another example, the operator policy may specify that an AUSF in the other network is not allowed to access the UDM in the second network 102.

Alternatively, or in addition, in some example embodiments, the operator policy may specify a configuration of allowed visited PLMN IDs. For example, a list of the allowed visited PLMN IDs may be maintained by the hSEPP 180. If the PLMN ID of the NFc 110 comprised in the access token request is matched with an entry in the list of the allowed visited PLMN IDs, the NFc 110 may be allowed to access the service of the NFp 120.

Alternatively, or in addition, in some example embodiments, the operator policy may specify a configuration of allowed visited SNPN IDs. For example, a list of the allowed home SNPN IDs may be maintained by the hSEPP 180. If the SNPN ID of the NFc 110 comprised in the access token request is matched with an entry in the list of the allowed visited SNPN IDs, the NFc 110 may be allowed to access the service of the NFp 120.

Alternatively, or in addition, in some example embodiments, the operator policy may specify a configuration of allowed NF set IDs. For example, in the case where the access token request comprises a NF set ID of the NFc 110, a list of the allowed NF set IDs may be maintained by the hSEPP 180. If the NF set ID of the NFc 110 comprised in the access token request is matched with an entry in the list of the allowed NF set IDs, the NFc 110 may be allowed to access the service of the NFp 120.

Alternatively, or in addition, in some example embodiments, the operator policy may specify a configuration of allowed service set IDs. For example, in the case where the access token request comprises a service set ID of the NFc 110, a list of the allowed service set IDs may be maintained by the hSEPP 180. If the service set ID of the NFc 110 comprised in the access token request is matched with an entry in the list of the allowed service set IDs, the NFc 110 may be allowed to access the service of the NFp 120.

Alternatively, or in addition, in some example embodiments, the operator policy may specify a configuration of allowed vendor IDs. For example, in the case where the access token request comprises a vendor ID of the NFc 110, a list of the allowed vendor IDs may be maintained by the hSEPP 180. If the vendor ID of the NFc 110 comprised in the access token request is matched with an entry in the list of the allowed vendor IDs, the NFc 110 may be allowed to access the service of the NFp 120.

Alternatively, or in addition, in some example embodiments, the operator policy may specify a configuration of allowed domain IDs. For example, in the case where the access token request comprises a domain ID of the NFc 110, a list of the allowed domain IDs may be maintained by the hSEPP 180. If the domain ID of the NFc 110 comprised in the access token request is matched with an entry in the list of the allowed domain IDs, the NFc 110 may be allowed to access the service of the NFp 120.

It is to be understood that the above allowed configurations are given for the purpose of illustration without any limitation. The hSEPP 180 can validate the access token request based on any suitable allowed configuration, for example, as specified by the operator policy.

Similar to the vSEPP 170, a successful validation of the access token request by the hSEPP 180 can be defined in any suitable manner. The protection scope of the present disclosure is not limited in this regard.

If the validation of the access token request by the hSEPP 180 is unsuccessful, it means that the NFc 110 is not allowed to access the expected service. In this case, the hSEPP 180 may provide a rejection response to the NFc 110 to indicate that the access token request is rejected. Specifically, the rejection response can be forwarded to the NFc 110 via the hSEPP 180 and the vNRF 150.

If the validation of the access token request by the hSEPP 180 is successful, the hSEPP 180 transmits 345 the access token request with the verified information concerning the NFc 110 to the hNRF 160 in the second network 102. For example, the hSEPP 180 may transmit the access token request comprising the custom header "3GPP_SBI_NFc" to the hNRF 160. Alternately, in some example embodiments, the hSEPP 180 may transmit the access token request to the hNRF 160 without validation. For example, if the custom header is not used, the hSEPP 180 allows the access token request to the hNRF 160.

In the example embodiments where the vSEPP 170 signs the verified information, the hSEPP 180 may validate the signature of the vSEPP 170. In some example embodiments, if the signature of the vSEPP 170 is successfully validated, the hSEPP 180 may transmit the access token request without any signature to the hNRF 160. That is, the hSEPP 180 may remove the signature of the vSEPP 170 from the access token request and rewrite the verified information without any signature. Such example embodiments are feasible because any element in the second network 102 trusts that data coming from the hSEPP 180 has been verified.

Alternatively, in some example embodiments, if the signature of the vSEPP 170 is successfully validated, the hSEPP 180 may sign the verified information. For example, the hSEPP 180 may generate another signature based on the verified information and transmit the access token request comprising the verified information and the signature of the hSEPP 180. In the case where the verified information is comprised in the custom header, the hSEPP 180 may sign the custom header. In such example embodiments, signing the verified information by the hSEPP 180 can provide additional authenticity to the hNRF 160 receiving the access token request.

Upon receiving the access token request from the hSEPP 180, the hNRF 160 authorizes the NFc 110 base on the verified information concerning the NFc 110 comprised in the access token request. In the example embodiments where the hSEPP 180 signs the verified information, the hNRF 160 may validate the signature of the hSEPP 180. If the signature of the hSEPP 180 is successfully validated, the hNRF 180 authorizes the NFc 110.

The hNRF 160 determines whether the NFc 110 is authorized to access the expected service from the NFp 120 based on the verified information concerning the NFc 110. In this way, the NFc 110 even if located in a different network from the NFp 120 can be authorized without the NF profile of the NFc 110.

If the NFc 110 is authorized to access the expected service, the hNRF 160 generates the access token and provides 355 the access token to the NFc 110. For example, the hNRF 160 may transmit to the hSEPP 180 an access token response including the generated access token, which is then forwarded to the NFc 110 via the vSEPP 170 and the vNRF 150. Although not shown, it is to be understood that if the NFc 110 is not authorized to access the expected service, the hNRF 160 may provide a rejection response or an error response to the NFc 110.

In the example process 300, the information concerning the NFc 110 is verified by the vNRF 150 and the verified information is added into the access token request by the vNRF 150. In other words, the vNRF 150 modifies the access token request.

Another Example Process for Inter-Network Communication

Figure 4:
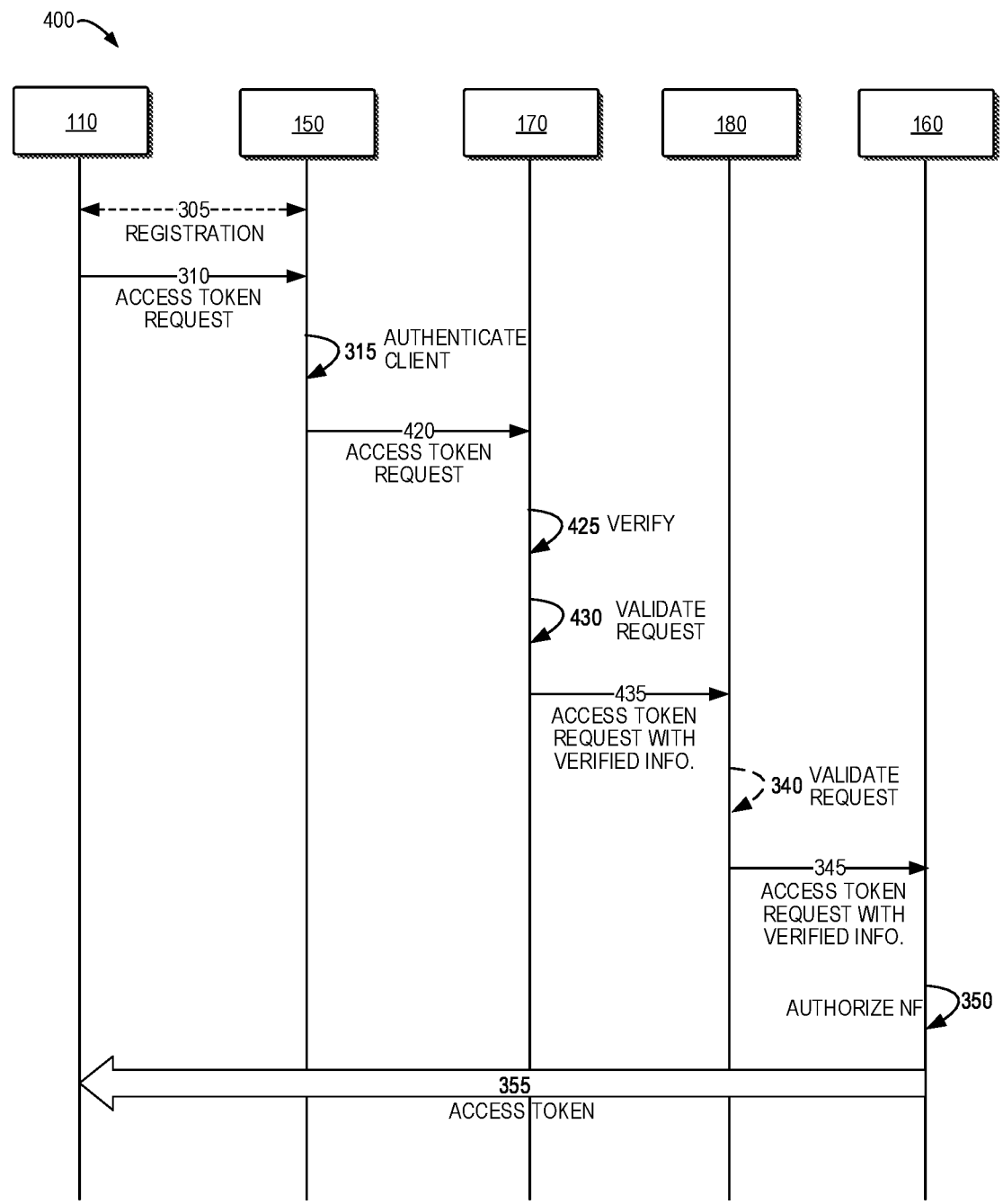
FIG. 4 illustrates an interaction diagram of another example process for obtaining an access token through inter-network communication according to some example embodiments of the present disclosure.

FIG. 4 illustrates an interaction diagram of another example process 400 for obtaining an access token through inter-network communication according to some example embodiments of the present disclosure. As shown in FIG. 4, the process 400 may involve the NFc 110, the vNRF 150, the vSEPP 170, the hSEPP 180, and the hNRF 160 as shown in FIG. 1. It is to be understood that acts with the same reference signs as in FIG. 3 are same as those described with reference to FIG. 3 and thus are not repeatedly described here.

In the example process 400, the vNRF 150 does not verify the information concerning the NFc 110. Instead, the vNRF 150 transmits 420 the access token request to the vSEPP 170. That is, in the example process 400, the vNRF 150 does not modify the access token request.

Upon receiving the access token request, the vSEPP 170 verifies 425 the information concerning the NFc 110 based on a NF profile of the NFc 110. The NF profile of the NFc 110 can be obtained by any suitable manner, for example, received from the vNRF 150. The information concerning the NFc 110 may comprise the one or more parameters related to the NFc 110, as described above with reference to FIG. 3. The vSEPP 170 may read the one or more parameters related to the NFc 110 from the access token request. The vSEPP 170 may further verify whether the one or more parameters available in the access token request are matched with corresponding parameters in the NF profile of the NFc 110.

The vSEPP 170 adds the verified information concerning the NFc 110 into the access token request. As described with reference to FIG. 3, the verified information may comprise the one or more parameters related to the NFc 110 and corresponding verification result and thus is not repeated here.

In some example embodiments, the vSEPP 170 may generate a header comprising the verified information and add the header into the access token request. For example, the custom header named "3GPP_SBI_NFc" as described above may be added into the access token request by the vSEPP 170.

The vSEPP 170 validates 430 the access token request received from the vNRF 150. Specifically, the vSEPP 170 validates the information concerning the NFc 110 comprised in the access token request based on configurations allowed to access services provided by other networks. For example, the allowed configurations may be specified by an operator policy for the first network 101, as described with reference to FIG. 3.

If the validation of the access token request by the vSEPP 170 is unsuccessful, it means that the NFc 110 is not allowed to access the expected service. In this case, the vSEPP 170 may provide a rejection response to the NFc 110 to indicate that the access token request is rejected. Specifically, the vSEPP 170 may transmit the rejection response to the vNRF 150, which forwards the rejection response to the NFc 110.

If the validation of the access token request by the vSEPP 170 is successful, the vSEPP 170 transmits 435 the access token request with the verified information concerning the NFc 110 to the hSEPP 180 located at the edge of the second network 102. For example, the vSEPP 170 may transmit the access token request comprising the header "3GPP_S-BI_NFc" to the hSEPP 180.

In some example embodiments, the vSEPP 170 may sign the verified information. For example, the vSEPP 170 may generate a signature based on the verified information and transmit the access token request comprising the verified information and the signature of the vSEPP 170. In the case where the verified information is comprised in the custom header, the vSEPP 170 may sign the custom header.

In the example process 400, the information concerning the NFc 110 is verified by the vSEPP 170 and the verified information is added into the access token request by the vSEPP 170. In other words, the vSEPP 170 modifies the access token request.

It is to be understood that in the processes 300 and 400, the hSEPP 180 and the vSEPP 170 may communicate with each other via the N32 interface or the IPX node(s) 190. In the case where the hSEPP 180 and the vSEPP 170 communicate with each other via the IPX node(s) 190, the IPX node(s) 190 may merely forward the access token request without any modification.

As can be seen from the example processes 300 and 400, information concerning the NFc is verified by the vNRF or the vSEPP and the verified information is added into the access token request to be received by the hNRF. Only after successful verification and validation, the access token request is forwarded to the hNRF. Such verification enables the hNRF to trust the NFc related information available in the access token request coming from the vNRF and the vSEPP without knowing the NF profile of the NFc. In this way, the NFc can be authorized to the NFp in the inter-network scenario.

Example Methods and Apparatuses

More details of the example embodiments in accordance with the present disclosure will be described with reference to FIGS. 5-10.

Figure 5:
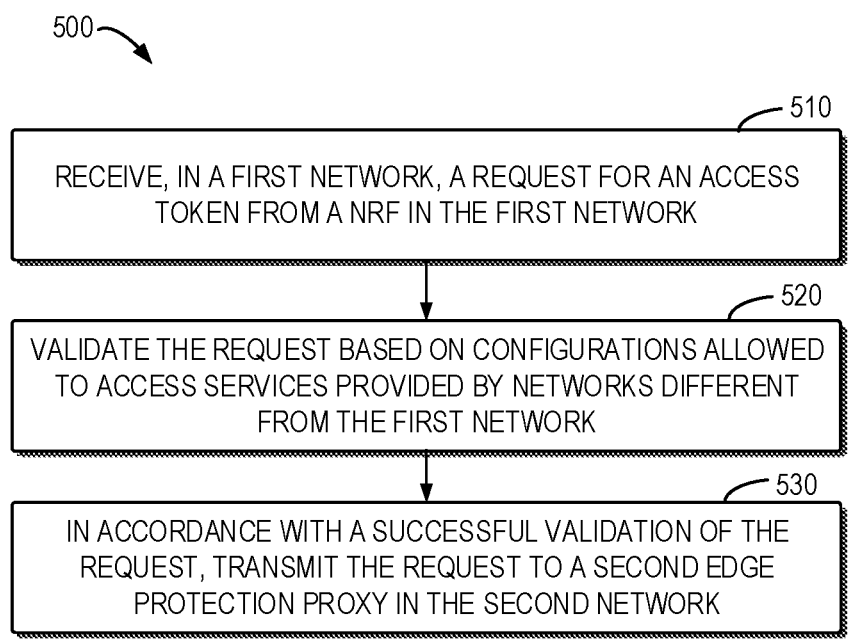
FIG. 5 illustrates a flowchart of an example method implemented at an edge protection proxy according to some example embodiments of the present disclosure.

FIG. 5 illustrates a flowchart of an example method 500 according to some example embodiments of the present disclosure. The method 500 can be implemented at a first edge protection proxy, for example, the vSEPP 170 as shown in FIG. 1. It is to be understood that the method 500 may include additional blocks not shown and/or may omit some shown blocks, and the scope of the present disclosure is not limited in this regard.

At block 510, the first edge protection proxy receives, in a first network 101, a request for an access token from a NRF (for example, the vNRF 150) in the first network 101. The access token is to be used by a first NF (for example, the NFc 110) in the first network 101 to request a service from a second NF (for example, the NFp 120) in a second network 102.

At block 520, the first edge protection proxy validates the request based on configurations allowed to access services provided by networks different from the first network 101. At block 530, in accordance with a successful validation of the request, the first edge protection proxy transmits the request to a second edge protection proxy (for example, the hSEPP 180) in the second network 102. The transmitted request comprises verified information concerning the first NF.

In some example embodiments, validating the request comprises: determining, from the request, the verified information generated by the NRF; and validating the request based on the verified information and the configurations allowed to access services provided by networks different from the first network.

In some example embodiments, the method 500 further comprises: determining, from the request, information concerning the first NF; verifying the information concerning the first NF; and adding the verified information concerning the first NF into the request.

In some example embodiments, validating the request comprises: validating the request based on the information determined from the request and the configurations allowed to access services provided by networks different from the first network.

In some example embodiments, transmitting the request comprises: generating a signature of the first edge protection proxy based on the verified information; and transmitting the request comprising the verified information and the signature to the second edge protection proxy.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the configurations allowed to access services provided by networks different from the first network comprise at least one of: allowed NF types, allowed PLMN identifiers, allowed SNPN identifiers, allowed NF set identifiers, allowed service set identifiers, allowed vendor identifiers, or allowed domain identifiers.

In some example embodiments, the method 500 further comprises: in accordance with an unsuccessful validation of the request, transmitting to the NRF a response indicating a rejection of the request.

In some example embodiments, the verified information is comprised in a header of the request.

Figure 6:
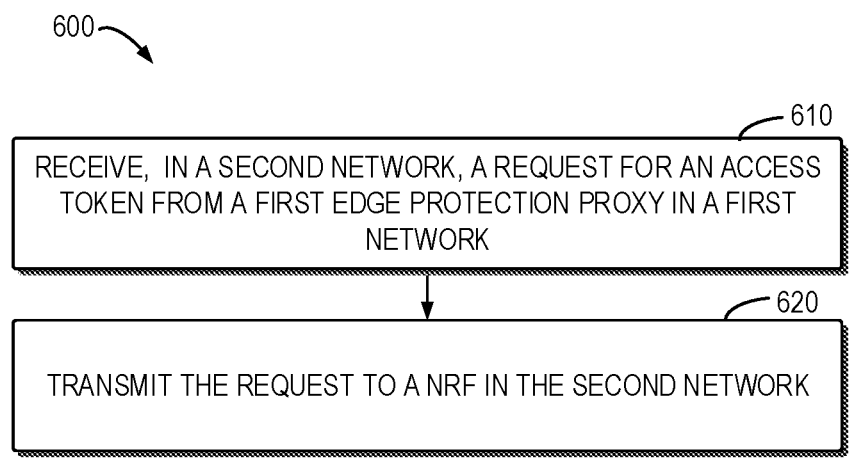
FIG. 6 illustrates a flowchart of an example method implemented at another edge protection proxy according to some example embodiments of the present disclosure.

FIG. 6 illustrates a flowchart of an example method 600 according to some example embodiments of the present disclosure. The method 600 can be implemented at a second edge protection proxy, for example, the hSEPP 180 as shown in FIG. 1. It is to be understood that the method 600 may include additional blocks not shown and/or may omit some shown blocks, and the scope of the present disclosure is not limited in this regard.

At block 610, the second edge protection proxy receives, in a second network 102, a request for an access token from a first edge protection proxy (for example, the vSEPP 170) in a first network 101. The access token is to be used by a first NF (for example, the NFc 110) in the first network 101 to request a service from a second NF (for example, the NFp 120) in the second network 102. The request comprises verified information concerning the first NF.

At block 620, the second edge protection proxy transmits the request to a NRF in the second network 102. In some example embodiments, transmitting the request comprises: validating a first signature of the first edge protection proxy in the request; and in accordance with a successful validation of the first signature, transmitting the request without the first signature to the NRF.

In some example embodiments, transmitting the request without the first signature to the NRF comprises: generating a second signature of the second edge protection proxy based on the verified information; and transmitting the request comprising the verified information and the second signature to the NRF.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the second edge protection proxy validates the request based on verified information concerning the first NF and configurations allowed to access services provided by the second network 102. In accordance with a successful validation of the request, the second edge protection proxy transmits the request to the NRF. In accordance with an unsuccessful validation of the request, the second edge protection proxy transmits to the first edge protection proxy a response indicating a rejection of the request In some example embodiments, the configurations allowed to access services provided by networks different from the first network comprise at least one of: allowed NF types, allowed PLMN identifiers, allowed SNPN identifiers, allowed NF set identifiers, allowed service set identifiers, allowed vendor identifiers, or allowed domain identifiers.

In some example embodiments, the verified information is comprised in a header of the request.

Figure 7:
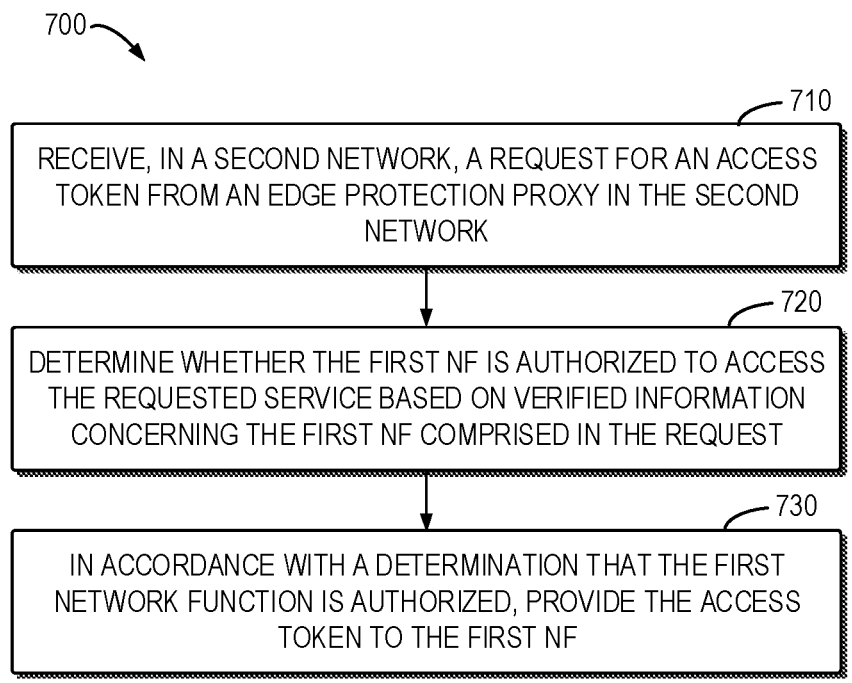
FIG. 7 illustrates a flowchart of an example method implemented at a network repository function according to some example embodiments of the present disclosure.

FIG. 7 illustrates a flowchart of an example method 700 according to some example embodiments of the present disclosure. The method 700 can be implemented at a NRF, for example, the hNRF 160 as shown in FIG. 1. It is to be understood that the method 700 may include additional blocks not shown and/or may omit some shown blocks, and the scope of the present disclosure is not limited in this regard.

At block 710, the NRF receives, in a second network 102, a request for an access token from an edge protection proxy (for example, the hSEPP 180) in the second network 102. The access token is to be used by a first NF (for example, the NFc 110) in a first network 101 to request a service from a second NF (for example, the NFp 120) in the second network 102.

At block 720, the NRF determines whether the first NF is authorized to access the requested service based on verified information concerning the first NF comprised in the request. At block 730, in accordance with a determination that the first NF is authorized, the NRF provides the access token to the first NF.

In some example embodiments, the method 700 further comprises: validating a signature of the edge protection proxy in the request.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the verified information is comprised in a header of the request.

Figure 8:
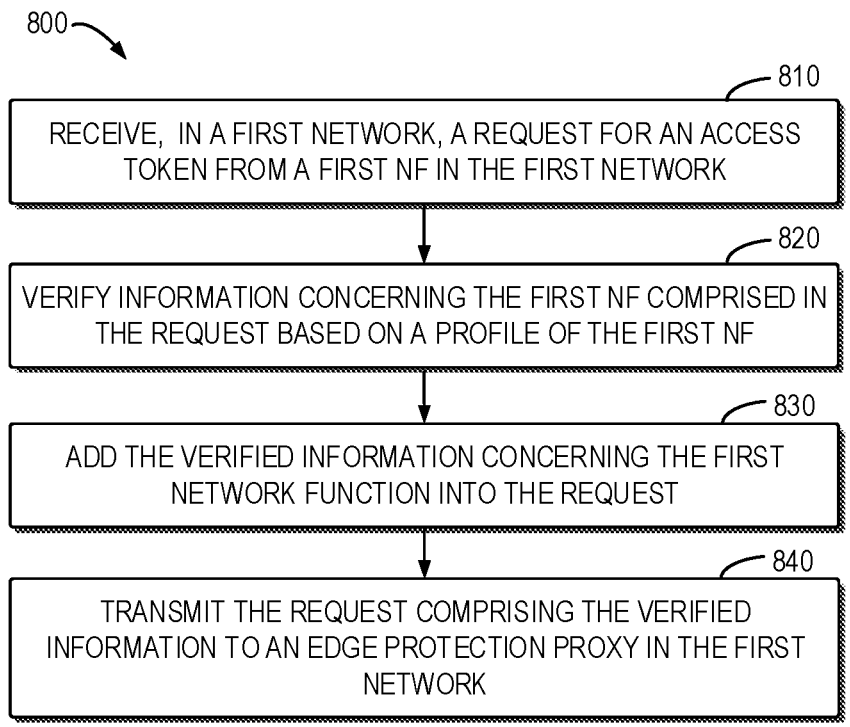
FIG. 8 illustrates a flowchart of an example method implemented at another network repository function according to some example embodiments of the present disclosure.

FIG. 8 illustrates a flowchart of an example method 800 according to some example embodiments of the present disclosure. The method 800 can be implemented at a NRF, for example, the vNRF 150 as shown in FIG. 1. It is to be understood that the method 800 may include additional blocks not shown and/or may omit some shown blocks, and the scope of the present disclosure is not limited in this regard.

At block 810, the NRF receives, in a first network 101, a request for an access token from a first NF (for example, the NFc 110) in the first network 101. The access token is to be used by the first NF to request a service from a second NF (for example, the NFp 120) in a second network 102.

At block 820, the NRF verifies information concerning the first NF comprised in the request based on a profile of the first NF. At block 830, the NRF adds the verified information concerning the first NF into the request. At block 840, the NRF transmits the request comprising the verified information to an edge protection proxy (for example, the vSEPP 170) in the first network 101.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the verified information is comprised in a header of the request.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 comprises: means for receiving, at a first edge protection proxy in a first network, a request for an access token from a network repository function in the first network, the access token to be used by a first network function in the first network to request a service from a second network function in a second network; means for validating the request based on configurations allowed to access services provided by networks different from the first network; and means for in accordance with a successful validation of the request, transmitting the request to a second edge protection proxy in the second network, the transmitted request comprising verified information concerning the first network function.

In some example embodiments, the means for validating the request comprises: means for determining, from the request, the verified information generated by the network repository function; and means for validating the request based on the verified information and the configurations allowed to access services provided by networks different from the first network.

In some example embodiments, the apparatus capable of performing the method 500 further comprises: means for determining, from the request, information concerning the first network function; means for verifying the information concerning the first network function based on a profile of the first network function; and means for adding the verified information concerning the first network function into the request.

In some example embodiments, the means for validating the request comprises: means for validating the request based on the information determined from the request and the configurations allowed to access services provided by networks different from the first network.

In some example embodiments, the means for transmitting the request comprises: means for generating a signature of the first edge protection proxy based on the verified information; and means for transmitting the request comprising the verified information and the signature to the second edge protection proxy.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the configurations allowed to access services provided by networks different from the first network comprise at least one of: allowed NF types, allowed PLMN identifiers, allowed SNPN identifiers, allowed NF set identifiers, allowed service set identifiers, allowed vendor identifiers, or allowed domain identifiers.

In some example embodiments, the verified information is comprised in a header of the request.

In some example embodiments, the apparatus capable of performing the method 500 further comprises means for in accordance with an unsuccessful validation of the request, transmitting to the network repository function a response indicating a rejection of the request.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 comprises: means for receiving, at a second edge protection proxy in a second network, a request for an access token from a first edge protection proxy in a first network, the access token to be used by a first network function in the first network to request a service from a second network function in the second network, the request comprising verified information concerning the first network function; and means for transmitting the request to a network repository function in the second network.

In some example embodiments, the means for transmitting the request comprises: means for validating a first signature of the first edge protection proxy in the request; and means for in accordance with a successful validation of the first signature, transmitting the request without the first signature to the network repository function.

In some example embodiments, the means for transmitting the request without the first signature to the network repository function comprises: means for generating a second signature of the second edge protection proxy based on the verified information; and means for transmitting the request comprising the verified information and the second signature to the network repository function.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the means for transmitting the request comprises: means for validating the request based on the verified information and configurations allowed to access services provided by the second network; and means for in accordance with a successful validation of the request, transmitting the request to the network repository function in the second network.

In some example embodiments, the configurations allowed to access services provided by networks different from the first network comprise at least one of: allowed NF types, allowed PLMN identifiers, allowed SNPN identifiers, allowed NF set identifiers, allowed service set identifiers, allowed vendor identifiers, or allowed domain identifiers.

In some example embodiments, the apparatus capable of performing the method 600 further comprises means for in accordance with an unsuccessful validation of the request, transmitting to the first edge protection proxy a response indicating a rejection of the request.

In some example embodiments, the verified information is comprised in a header of the request.

In some example embodiments, an apparatus capable of performing the method 700 may comprise means for performing the respective steps of the method 700. The means may be implemented in any suitable form. For example, the means may be implemented in a circuitry or software module.

In some example embodiments, the apparatus capable of performing the method 700 comprises: means for receiving, at a network repository function in a second network, a request for an access token from an edge protection proxy in the second network, the access token to be used by a first network function in a first network to request a service from a second network function in the second network; means for determining whether the first network function is authorized to access the requested service based on verified information concerning the first network function comprised in the request; and means for in accordance with a determination that the first network function is authorized, providing the access token to the first network function.

In some example embodiments, the apparatus capable of performing the method 700 further comprises: validating a signature of the edge protection proxy in the request.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the verified information is comprised in a header of the request.

In some example embodiments, an apparatus capable of performing the method 800 may comprise means for performing the respective steps of the method 800. The means may be implemented in any suitable form. For example, the means may be implemented in a circuitry or software module.

In some example embodiments, the apparatus capable of performing the method 800 comprises: means for receiving, at a network repository function in a first network, a request for an access token from a first network function in the first network, the access token to be used by the first network function to request a service from a second network function in a second network; means for verifying information concerning the first network function comprised in the request based on a profile of the first network function; means for adding the verified information concerning the first network function into the request; and means for transmitting the request comprising the verified information to an edge protection proxy in the first network.

In some example embodiments, the verified information comprises at least one of: a NF type of the first NF and a verification result of the NF type, a PLMN identifier of the first NF and a verification result of the PLMN identifier, a SNPN identifier of the first NF and a verification result of the SNPN identifier, a NF set identifier of the first NF and a verification result of the NF set identifier, a service set identifier of the first NF and a verification result of the service set identifier, a vendor identifier of the first NF and a verification result of the vendor identifier, or a domain identifier of the first NF and a verification result of the domain identifier.

In some example embodiments, the verified information is comprised in a header of the request.

Figure 9:
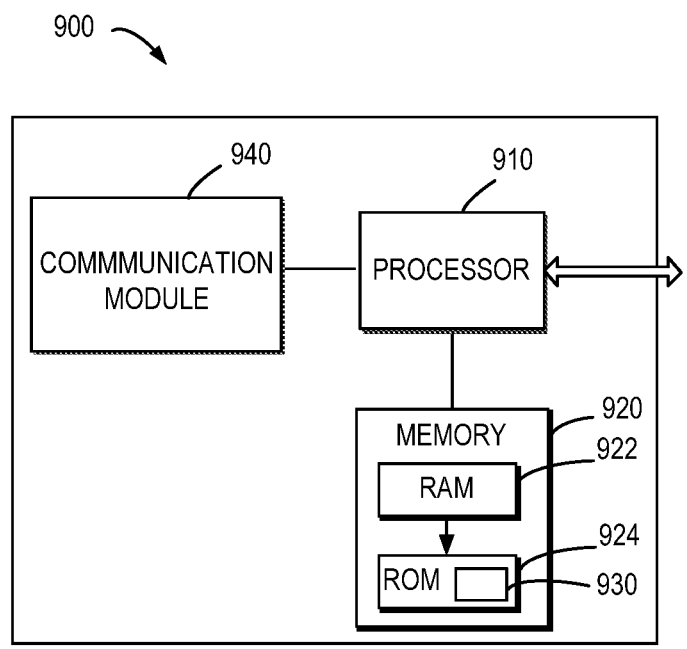
FIG. 9 illustrates a simplified block diagram of a device that is suitable for implementing embodiments of the present disclosure.

FIG. 9 is a simplified block diagram of a device 900 that is suitable for implementing embodiments of the present disclosure. For example, the NFc 110, the NFp 120, the vNRF 150, the hNRF 160, the vSEPP 170 and/or the hSEPP 180 can be implemented by the device 900. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 3 to 8. The embodiments of the present disclosure may also be implemented by hardware or by a combination of software and hardware.

Figure 10:
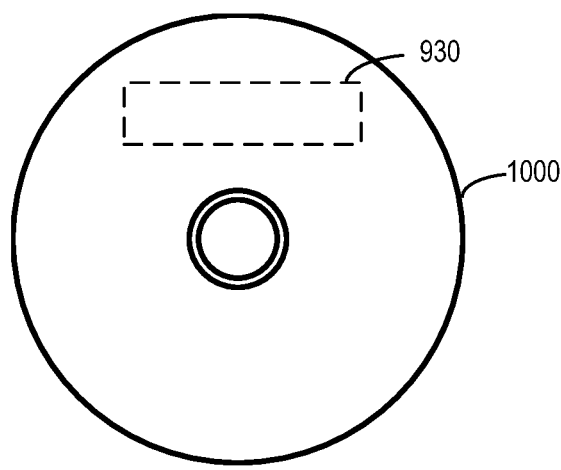
FIG. 10 illustrates a block diagram of an example computer readable medium in accordance with some example embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 900 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 900 may be instead comprised in the distributed unit, and at least some of the described processes may be performed by the distributed unit.

In an embodiment, the execution of at least some of the functionalities of the device 900 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 900 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500, 600, 700 or 800 as described above with reference to FIGS. 5-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory including computer program code;
   the at least one memory and the computer program codes are configured to, with the at least one processor, cause the apparatus to:
   receive, at a first edge protection proxy in a first network, a request for an access token from a network repository function in the first network, the access token to be used by a first network function in the first network to request a service from a second network function in a second network;
   validate the request based on configurations allowed to access services provided by networks different from the first network; and
   in accordance with a successful validation of the request, transmit the request to a second edge protection proxy in the second network, the transmitted request comprising verified information concerning the first network function.

2. The apparatus of claim 1, wherein the apparatus is further caused to:
   determine, from the request, the verified information generated by the network repository function; and
   validate the request based on the verified information and the configurations allowed to access services provided by networks different from the first network.

3. The apparatus of claim 1, wherein the apparatus is further caused to:
   determine, from the request, information concerning the first network function;
   verify the information concerning the first network function; and
   add the verified information concerning the first network function into the request.

4. The apparatus of claim 3, wherein the apparatus is further caused to:
   validate the request based on the information determined from the request and the configurations allowed to access services provided by networks different from the first network.

5. The apparatus of claim 1, wherein the apparatus is further caused to:
   generate a signature of the first edge protection proxy based on the verified information; and
   transmit the request comprising the verified information and the signature to the second edge protection proxy.

6. The apparatus of claim 1, wherein the verified information comprises at least one of:
   a network function type of the first network function and a verification result of the network function type,
   a Public Land Mobile Network identifier of the first network function and a verification result of the Public Land Mobile Network identifier,
   a Standalone Non-Public Network identifier of the first network function and a verification result of the Standalone Non-Public Network identifier,
   a network function set identifier of the first network function and a verification result of the network function set identifier,
   a service set identifier of the first network function and a verification result of the service set identifier,
   a vendor identifier of the first network function and a verification result of the vendor identifier, or
   a domain identifier of the first network function and a verification result of the domain identifier.

7. The apparatus of claim 1, wherein the configurations allowed to access services provided by networks different from the first network comprise at least one of:
   allowed network function types,
   allowed Public Land Mobile Network identifiers,
   allowed Standalone Non-Public Network identifiers,
   allowed network function set identifiers,
   allowed service set identifiers,
   allowed vendor identifiers, or
   allowed domain identifiers.

8. The apparatus of claim 1, wherein the verified information is comprised in a header of the request.

9. The apparatus of claim 1, wherein the apparatus is further caused to:
   in accordance with an unsuccessful validation of the request, transmit to the network repository function a response indicating a rejection of the request.

10. An apparatus comprising:
at least one processor; and
at least one memory including computer program code;
the at least one memory and the computer program codes are configured to, with the at least one processor, cause the apparatus to:
receive, at a second edge protection proxy in a second network, a request for an access token from a first edge protection proxy in a first network, the access token to be used by a first network function in the first network to request a service from a second network function in the second network, the request comprising verified information concerning the first network function; and
transmit the request to a network repository function in the second network.

11. The apparatus of claim 10, wherein the apparatus is further caused to:
validate a first signature of the first edge protection proxy in the request; and
in accordance with a successful validation of the first signature, transmit the request without the first signature to the network repository function.

12. The apparatus of claim 11, wherein the apparatus is further caused to:
generate a second signature of the second edge protection proxy based on the verified information; and
transmit the request comprising the verified information and the second signature to the network repository function.

13. The apparatus of claim 10, wherein the verified information comprises at least one of:
a network function type of the first network function and a verification result of the network function type,
a Public Land Mobile Network identifier of the first network function and a verification result of the Public Land Mobile Network identifier,
a Standalone Non-Public Network identifier of the first network function and a verification result of the Standalone Non-Public Network identifier,
a network function set identifier of the first network function and a verification result of the network function set identifier,
a service set identifier of the first network function and a verification result of the service set identifier,
a vendor identifier of the first network function and a verification result of the vendor identifier, or
a domain identifier of the first network function and a verification result of the domain identifier.

14. The apparatus of claim 10, wherein the apparatus is further caused to:
validate the request based on the verified information and configurations allowed to access services provided by the second network; and
in accordance with a successful validation of the request, transmit the request to the network repository function.

15. The apparatus of claim 14, wherein the configurations allowed to access services provided by the second network comprise at least one of:
allowed network function types,
allowed Public Land Mobile Network identifiers,
allowed Standalone Non-Public Network identifiers,
allowed network function set identifiers,
allowed service set identifiers,
allowed vendor identifiers, or
allowed domain identifiers.

16. The apparatus of claim 14, wherein the apparatus is further caused to:
in accordance with an unsuccessful validation of the request, transmit to the first edge protection proxy a response indicating a rejection of the request.

17. The apparatus of claim 10, wherein the verified information is comprised in a header of the request.

18. An apparatus comprising:
at least one processor; and
at least one memory including computer program code;
the at least one memory and the computer program codes are configured to, with the at least one processor, cause the apparatus to:
receive, at a network repository function in a second network, a request for an access token from an edge protection proxy in the second network, the access token to be used by a first network function in a first network to request a service from a second network function in the second network;
determine whether the first network function is authorized to access the requested service based on verified information concerning the first network function comprised in the request; and
in accordance with a determination that the first network function is authorized, provide the access token to the first network function.

19. The apparatus of claim 18, wherein the apparatus is further caused to:
validate a signature of the edge protection proxy in the request.

20. The apparatus of claim 18, wherein the verified information comprises at least one of:
a network function type of the first network function and a verification result of the network function type,
a Public Land Mobile Network identifier of the first network function and a verification result of the Public Land Mobile Network identifier,
a Standalone Non-Public Network identifier of the first network function and a verification result of the Standalone Non-Public Network identifier,
a network function set identifier of the first network function and a verification result of the network function set identifier,
a service set identifier of the first network function and a verification result of the service set identifier,
a vendor identifier of the first network function and a verification result of the vendor identifier, or
a domain identifier of the first network function and a verification result of the domain identifier.

21. The apparatus of claim 18, wherein the verified information is comprised in a header of the request.

22. An apparatus comprising:
at least one processor; and
at least one memory including computer program code;
the at least one memory and the computer program codes are configured to, with the at least one processor, cause the apparatus to:
receive, at a network repository function in a first network, a request for an access token from a first network function in the first network, the access token to be used by the first network function to request a service from a second network function in a second network;
verify information concerning the first network function comprised in the request based on a profile of the first network function;

add the verified information concerning the first network function into the request; and transmit the request comprising the verified information to an edge protection proxy in the first network.

23. The apparatus of claim 22, wherein the verified information comprises at least one of:
a network function type of the first network function and a verification result of the network function type,
a Public Land Mobile Network identifier of the first network function and a verification result of the Public Land Mobile Network identifier,
a Standalone Non-Public Network identifier of the first network function and a verification result of the Standalone Non-Public Network identifier,
a network function set identifier of the first network function and a verification result of the network function set identifier,
a service set identifier of the first network function and a verification result of the service set identifier,
a vendor identifier of the first network function and a verification result of the vendor identifier, or
a domain identifier of the first network function and a verification result of the domain identifier.

24. The apparatus of claim 22, wherein the verified information is comprised in a header of the request.

* * * * *